US006947406B2

(12) United States Patent
Ramji

(10) Patent No.: US 6,947,406 B2
(45) Date of Patent: Sep. 20, 2005

(54) ESTABLISHING CONNECTIONS BETWEEN TERMINAL EQUIPMENT AND A MOBILE TERMINAL

(75) Inventor: Pilapakam B Ramji, Lake Bluff, IL (US)

(73) Assignee: Motorola, Inc, Schaumburg, IL (US)

( * ) Notice: Subject to any disclaimer, the term of this patent is extended or adjusted under 35 U.S.C. 154(b) by 93 days.

(21) Appl. No.: 10/744,822

(22) Filed: Dec. 23, 2003

(65) Prior Publication Data

US 2005/0135373 A1 Jun. 23, 2005

(51) Int. Cl.[7] ................................................ H04Q 7/20
(52) U.S. Cl. ...................................... 370/338; 370/522
(58) Field of Search ............................... 370/338, 522; 709/227, 228, 229

(56) References Cited

U.S. PATENT DOCUMENTS 5,708,655 A * 1/1998 Toth et al. .................. 370/313
6,608,832 B2 * 8/2003 Forslow ...................... 370/353
2002/0087701 A1 * 7/2002 Siikaniemi .................. 709/227
2002/0089942 A1 * 7/2002 Seppa et al. ................ 370/310
2004/0054794 A1 * 3/2004 Lantto et al. ............... 709/229
2004/0132473 A1 * 7/2004 Mir et al. ................... 455/517

* cited by examiner

*Primary Examiner*—Melvin Marcelo
(74) *Attorney, Agent, or Firm*—Charles W. Bethards

(57) ABSTRACT

A method (500, 600), and apparatus (110, 120) is provided for establishing a connection (111) between a terminal equipment TE (110) and mobile terminal MT (120). In one embodiment a control path is established between the MT and the TE over respective interfaces prior to a context activation associated with a dial-up request for an access session with a network (210). A command (401) is issued from the TE over the control path to set information related to the context activation. The information is preferably encoded and transferred over the control path in a native transfer mode and decoded prior to an issuance of the dial up request.

29 Claims, 5 Drawing Sheets

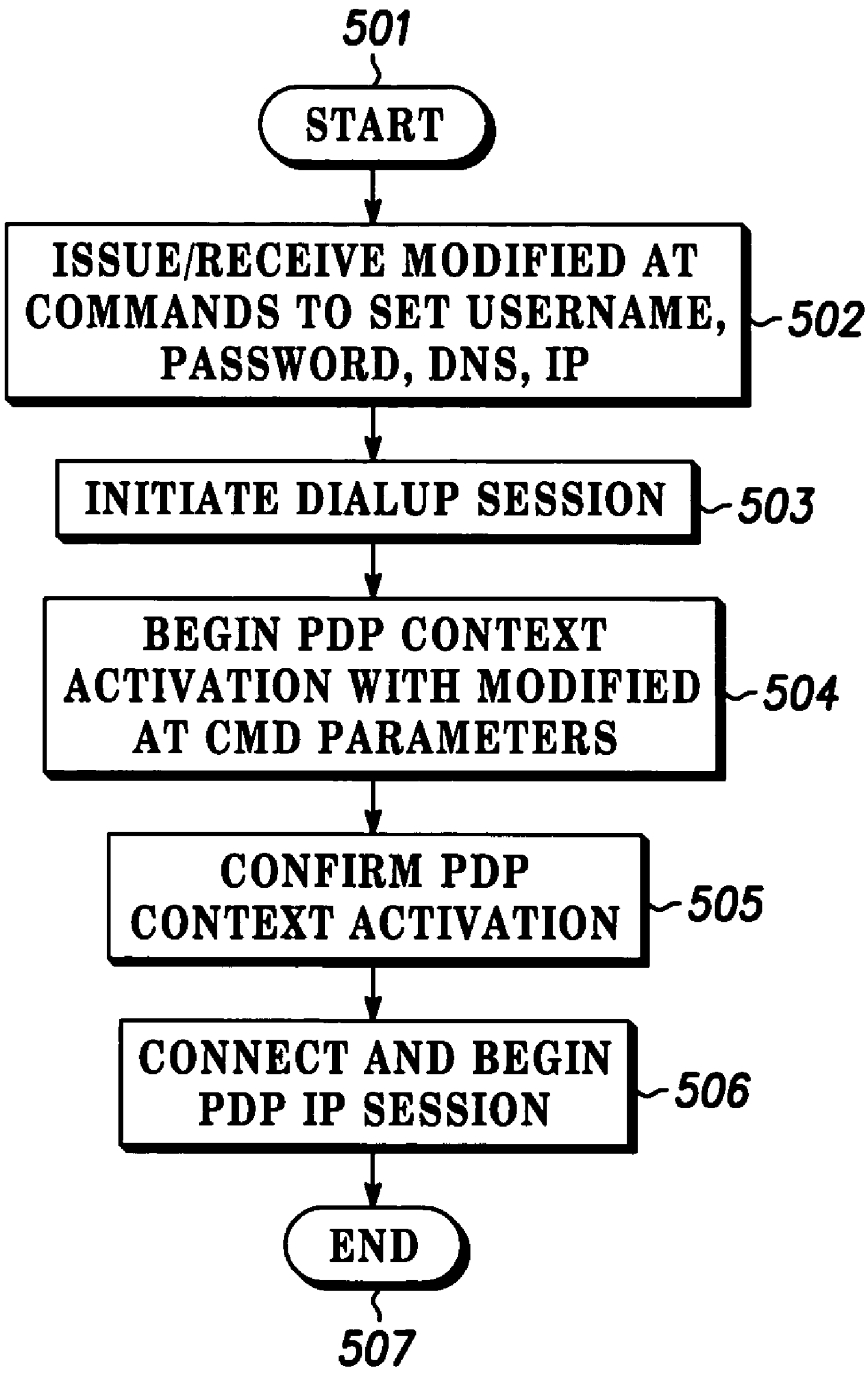
600 FIG. 6

ESTABLISHING CONNECTIONS BETWEEN TERMINAL EQUIPMENT AND A MOBILE TERMINAL

FIELD OF THE INVENTION

The present invention relates in general to data communications in packet networks, and more specifically a method and apparatus for establishing data link layer connections between a mobile terminal (MT) and a terminal equipment (TE).

BACKGROUND OF THE INVENTION

Mobile Terminals (MT), and in particular, MTs which are defined in accordance with the Global System for Mobile Communications (GSM) General Packet Radio Service (GPRS) are configured to enable user application programs, related software, routines and the like, to run on external Terminal Equipment (TE). Terminal equipment may be defined generally, for example, as any equipment fitting the definition of telecommunications terminal equipment as would be known to those of skill in the art. TE may include for example, computer equipment, LAN terminals, modems, routers, bridges, modules, or the like containing wired or wireless interfaces, such as cellular radio terminals, cellular radio base stations including Global System Mobile (GSM), 3rd Generation (3G) terminals and base stations, satellite earth station equipment such as Ship Earth Station (SES), and the like.

A typical MT may be connected to TE across a reference point (R interface in various standards), connection, arc, edge, or the like, and supports dial-up networking sessions, typically Internet Protocol (IP) based, with a service provider. It will be appreciated that the phrase "dial-up" refers to a modem type connection between the MT and TE using, for example, standard modem commands, and not to the manner in which the remaining portions of the session proceeds, which, as will be appreciated, is in accordance with various communications protocols including wireless protocols. A connection between the MT and TE is typically established using a data link layer protocol, and frequently, the data link layer protocol of choice is the Point to Point Protocol (PPP). The TE transport layer protocol is typically the Internet Protocol (IP) at the network layer. As is known to those of ordinary skill in the art, the PPP protocol is used for managing and controlling the data link across the TE to MT interface R. In addition MT and TE may communicate using standard AT modem commands further in accordance with specifications such as GSM, IS-136, and the like.

During conventional operation, the establishment of a connection using PPP typically proceeds in 3 stages: establishment of Link Control Protocol (LCP), Authentication including Password Authentication-PAP or Challenge Handshake Protocol-CHAP, and establishment of Network Control Protocol, typically the Internet Protocol Control Protocol (IPCP). For the PPP link to be successfully established, each of the above stages needs to be established by way of actions, negotiations, and the like which, according to the protocol specifications, must take place within certain time intervals, and under other time related constraints, capacity related constraints, acknowledgement constraints, re-transmission constraints and the like. It should be noted that, for example, the retry count and time period are not always configurable by an MT, subscriber, or the like, and may generally be implementation dependent inhibiting in many cases global pre-configurations, adaptability, or the like.

A GPRS MT may support applications running on an external TE device and using packet based data transfer. As noted above, a GPRS MT may provide a means to establish a link-layer connection between and with the TE and, for example, a network, which connection proceeds using PPP, as described for example in the Internet Engineering Task Force (IETF) document RFC 1661 and 1662: "The Point-to-Point Protocol (PPP)" (STD 51) (1994). The TE and MT may further use Internet Protocol Control Protocol (IPCP). IPCP is responsible for configuring, enabling, and disabling the IP protocol modules on both ends of a PPP link using the same packet exchange mechanism as the Link Control Protocol (LCP). IPCP packets may not be exchanged until PPP has reached the Network-Layer Protocol phase. IPCP packets received before this phase is reached should be silently discarded. Typically, each IPCP packet exchanged between the TE and the MT, has a timeout period set by the TE as 3 seconds and a maximum number of re-tries to 10. Accordingly, at the end of 30 seconds, a TE can bring a link down if there is no response by the IPCP peer. During IPCP, when an MT is configured for a PDP type IP session, the MT attempts to obtain a valid IP address from the network during context activation which can take up to 150 seconds.

Problems arise however in that, as noted, if context activation takes longer than the total timeout, the TE can bring down the link. As noted the timeout values and number of re-tries may not be configurable by the TE. In such cases, where values are not configurable, the link may be inhibited from being set up correctly.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages in accordance with the present invention.

FIG. 6 is a flow chart depicting various exemplary procedures associated with connection negotiation of an exemplary session between a mobile terminal and a terminal equipment in accordance with various exemplary embodiments.

DETAILED DESCRIPTION OF PREFERRED EMBODIMENTS

In overview, the present disclosure concerns the establishment of a connection over an interface from a device such as a portable computer, personal digital assistant (PDA), or the like, which device preferably conforms to the accepted definition of Terminal Equipment (TE), to a device such as a mobile terminal (MT), mobile receiver, communications unit, or the like and a method and apparatus for facilitating such connection establishment commonly referred to in the art as a "dial-up" connection. It should be noted that conventional methods typically require that a modem CONNECT occur and then a negotiation of a Point-to-Point Protocol (PPP) which eventually results in a context activation. As described, conventional methods are prone to timeout failure, in part due to waiting times associated with authentication. Thus, in accordance with various exemplary embodiments, the present invention allows authentication related parameters such as username, password, DNS address (note there are typically a primary and a second DNS address that will be referred to here as DNS address or addresses), IP address, etc. to be provided prior to a modem CONNECT, such that context activation can occur prior to PPP negotiation and timeouts can be avoided.

Figure 1:
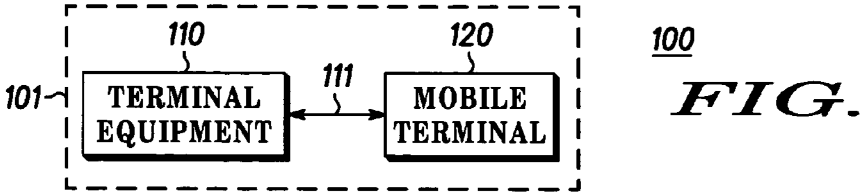
FIG. 1 is a block diagram depicting a connection between an exemplary mobile terminal and an exemplary terminal equipment.

It will be appreciated that establishing a connection may be performed in exemplary scenario 100 as shown in FIG. 1, between two stand alone devices such as TE 110 and MT 120 coupled by connection 111 which is, for example, a wired or wireless connection or, alternatively, TE 110 and MT 120 may be embodied within the same device 101. It will further be appreciated that the invention may be practiced in a device with a processor and software for performing TE and MT functions, an application specific integrated circuit (ASIC), a digital signal processor (DSP), or the like, or various combinations thereof, as would be appreciated by one of ordinary skill. Memory devices may further be provisioned with instructions, routines, and algorithms, or the like for operating on input data and providing output such as messages and responses to improve the performance of other processing blocks associated with, for example, reducing time delay, and otherwise appropriately handling the input data and managing the connection between TE 110 and MT 120.

It will further be appreciated that MTs, wireless communications units, or the like may refer to subscriber devices such as cellular or mobile phones, two-way radios, messaging devices, personal digital assistants, personal assignment pads, personal computers equipped for wireless operation, a cellular handset or device, or the like, or equivalents thereof provided such units are arranged and constructed for operation in accordance with the various inventive concepts and principles embodied in exemplary devices as discussed and described herein.

The principles and concepts discussed and described may be particularly applicable to MTs and associated communication units, devices, and systems providing or facilitating voice communications services or data or messaging services over wide area networks (WANs), such as conventional two way systems and devices, various cellular phone systems including analog and digital cellular, CDMA (code division multiple access) and variants thereof, GSM (Global System for Mobile communications), GPRS (General Packet Radio System), 2.5 G and 3G systems such as UMTS (Universal Mobile Telecommunication Service) systems, 4G Orthogonal Frequency Division Multiplex (OFDM) systems, integrated digital enhanced networks and variants or evolutions thereof. Principles and concepts described herein may further be applied in devices or systems with short range communications capability normally referred to as W-LAN capabilities, such as IEEE 802.11, Bluetooth, or Hiper-LAN and the like that preferably utilize CDMA, frequency hopping, orthogonal frequency division multiplexing, or TDMA access technologies and one or more of various networking protocols, such as TCP/IP (Transmission Control Protocol/Internet Protocol), IPX/SPX (Inter-Packet Exchange/Sequential Packet Exchange), Net BIOS (Network Basic Input Output System) or other protocol structures.

As described in greater detail hereinafter, various inventive principles are employed to provide connections between TEs and MTs such as those manufactured or otherwise provided by Motorola, Inc. of Schaumburg, Ill. In some embodiments these connection implement a solution by which a network address translation (NAT) is attempted in order to simulate, or "spoof" an IP address to the TE and where the TE is subsequently flowed off, e.g. using low level flow control or the like, to prevent data from being transferred, thus allowing the MT time to wait for the activation to complete. Data transfer is enabled by swapping the IP address for each packet as will be described in greater detail herein after, for example, with reference to FIG. 4. It should be noted however that some situations may arise where the actual IP address is preferred and thus the swapping solution may not be optimum. Additionally an MT may experience additional computational overhead in re-computing, for example checksums when the destination and source IP addresses are being swapped.

Thus an improved solution is described herein where additional commands, such as modem commands may be sent from the TE to provide parameters including a valid IP address to allow a context to be activated earlier than previously possible using conventional methods. As shown in FIG. 1, TE 110 and MT 120 may be coupled through a connection medium forming connection 111, which may be a wireless connection such as described above, including a Bluetooth connection or the like, or an infrared connection, or may be a wired connection such as a basic serial connection, a USB connection, or other connection, as would be known in the art. TE 110 and MT 120 are further capable of being co-located within the same device such as device 101.

Figure 2:
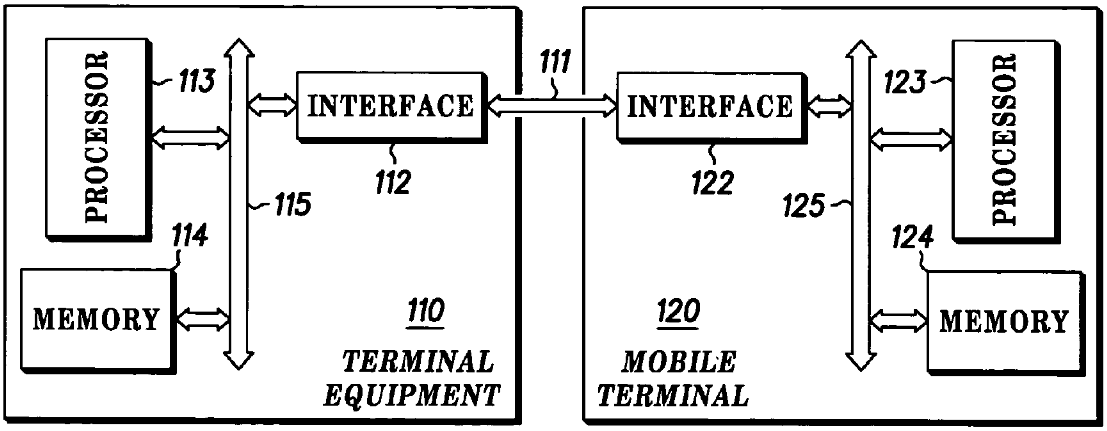
FIG. 2 is a block diagram depicting components of an exemplary mobile terminal and an exemplary terminal equipment.

Referring additionally to the more detailed diagram 200 of FIG. 2, it will be appreciated that in accordance with various exemplary embodiments, TE 110 typically includes interface 112 which is for example, an interface capable of physical layer communications, processor 113 which is for example, a general purpose processor, application specific processor, or the like, and memory 114 which is preferably a conventional memory device having access and retrieval parameters suitable for data transfer at speeds sufficient to facilitate communications between TE 110 and MT 120. Interface 112, processor 113, and memory 114 are preferably connected to each other through bus 115 which can be an interconnection such as a data bus or the like, suitable for data transfer at speeds sufficient to facilitate communication between TE 110 and MT 120. Memory 114 preferably contains software, or the like, including program instructions which, when executed, cause the processor to perform certain operations that carry out communications with, for example, MT 120 through interface 112 and connection 111 in accordance with various exemplary embodiments. MT 120 correspondingly includes interface 122, processor 123, memory 124, which are connected to each other through bus 125. Processor 123 is for example a general purpose processor, application specific processor, or the like, memory 124 is preferably a conventional memory device having access and retrieval parameters suitable for data transfer at speeds sufficient to facilitate communications between TE 110 and MT 120.

Figure 3:
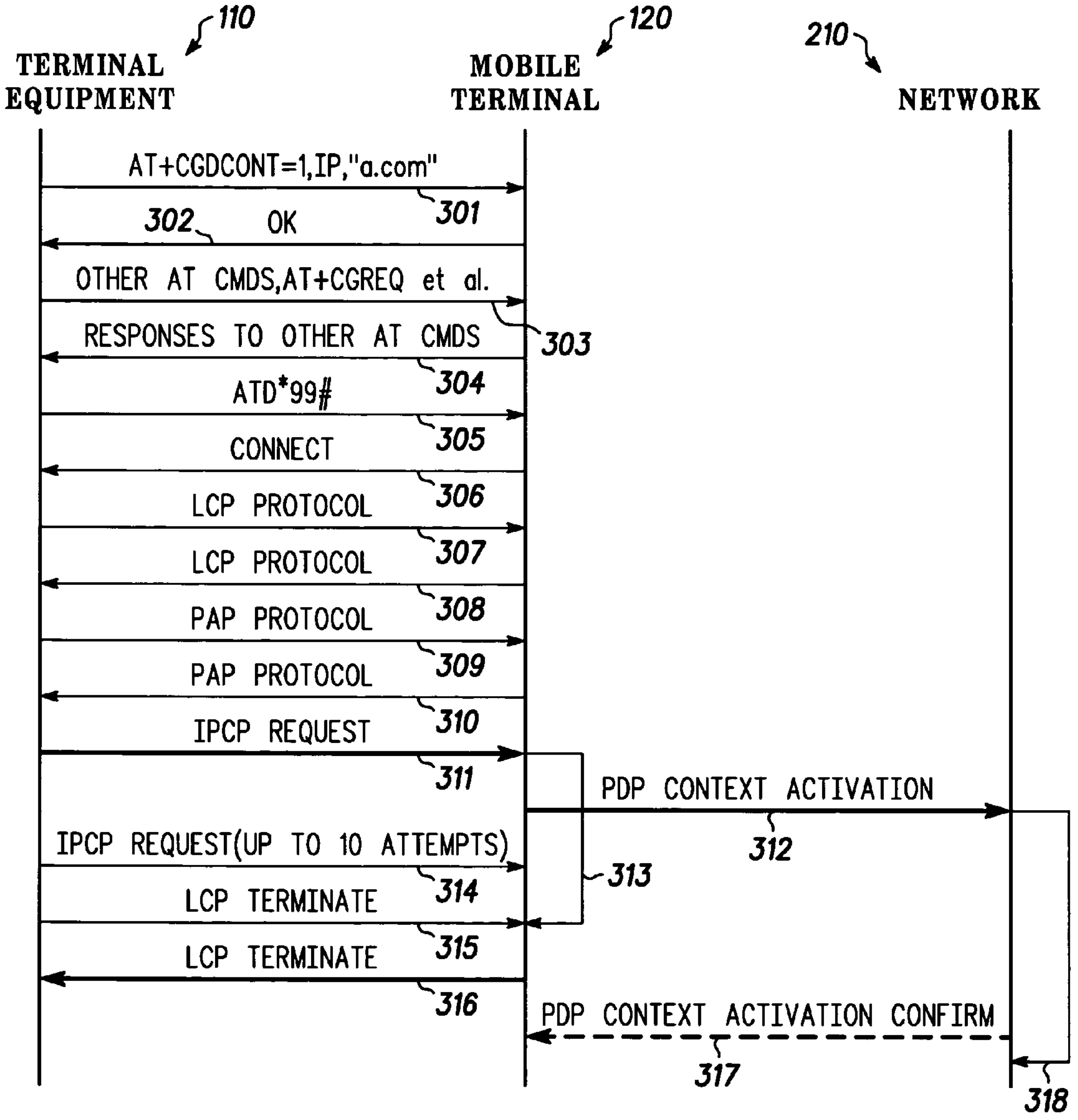
FIG. 3 is a connection diagram depicting a connection negotiation associated with a conventional session between a mobile terminal and a terminal equipment.

As previously described above, TE 110 and MT 120 establish a communication session over connection 111, using PPP negotiation that includes several stages such as LCP, PAP, and IPCP. As can be seen in the ladder diagram 300 of FIG. 3, the session established between TE 110 and MT 120 over connection 111 may further facilitate, for example, access to network 210 for data transfer using an IP or higher layer protocol, or the like. To initiate the session, TE 110 preferably issues command 301, which is an AT command as is known to those of ordinary skill in the art. AT commands are commonly referred to as the "Hayes" or modem command set. It will further be appreciated that for modem style connections, for example, as specified under GPRS, additional commands are provided, for example, in ETSI Technical Specification TS 127 007. Command 301 includes an "AT+CGDCONT=1,IP,"a.com"" command for configuring the PDP context associated with the session. MT 120 response 302 is "OK" which acknowledges the configuration associated with command 301. After acknowledgement, TE 110 can issue additional AT commands 303 or the like, to configure the session including configuring Quality of Service (QoS) parameters, and the like, to which MT 120 may respond with appropriate responses 304. Upon receiving any additional responses 304, TE 110 issues a dial command 305 including "ATD*99#" to which MT 120 issues response 306 including a "CONNECT" response.

It will be appreciated that the CONNECT issued in connection with response 306 is a spoof, since there is no connection, and since no PDP context has yet been established. Rather, the CONNECT issued in connection with response 306 triggers the initiation of PPP negotiation which, as described above, typically has three stages associated therewith, LCP, PAP/CHAP Authentication, and IPCP. LCP protocol messages 307 outbound from TE 110 may be responded to by MT 120 via LCP protocol messages 308 inbound to TE 110. Authentication may proceed with protocol messages 309 which are preferably PAP or CHAP messages outbound from TE 110 and protocol messages 310 returned by MT 120 inbound to TE 110. Given that each PPP packet transferred during negotiations can have a timeout associated therewith, and given that each stage has a fixed number of retries, timeouts can be as much as the number of retries multiplied by the value of the packet timeout.

During IPCP, TE 110 and MT 120 exchange IPCP packets for negotiating options such as, for example, IP addresses, DNS addresses, and the like. IP and DNS address negotiation can be static, where addresses are pre-allocated to the user, or dynamic where the addresses are requested by the user for the duration of the connection session. It should be noted that in a typical network it is seldom preferable to negotiate static addresses since IP addresses are scarce resources. Thus, during IP negotiation, for example during IPCP request 311, TE 110 requests an IP address from MT 120, either static or dynamic. Since the assigned IP address ultimately dictates routing information associated with subsequent data packets directed to TE 110, MT 120 must send a corresponding request to network 210 as part of PDP Context Activate Request 312. It should be noted that in making IPCP Request 311, timeout interval 313 is started for determining the amount of time allowed to activate a context as will be described herein after. Network 210 either acknowledges the request or rejects the request in the case of a static IP address, or assigns an IP address and passes it to MT 120 in the case of a dynamic request in PDP Context Activation Confirm message 317.

While awaiting Context Activation Confirm message 317, such as during timeout interval 313, TE 110 may issue up to 10 additional IPCP Requests 314, MT 120 may then respond with an IPCP Acknowledge message (not shown) including IP address information. Thus during IPCP, when MT 120 is configured for a PDP type IP session, an attempt is made to obtain a valid IP address from network 210. Since Context Activation, signified by the return of PDP Context Activation Confirm message 317, can take up to 150 seconds shown as activation interval 318, the link can be brought down by TE 110 at the end of timeout interval 313 with a LCP Terminate message 315 if activation takes longer than the total timeout set by TE 110. MT 120 may acknowledge the LCP Terminate message 315 with an LCP Terminate acknowledge 316.

Figure 4:
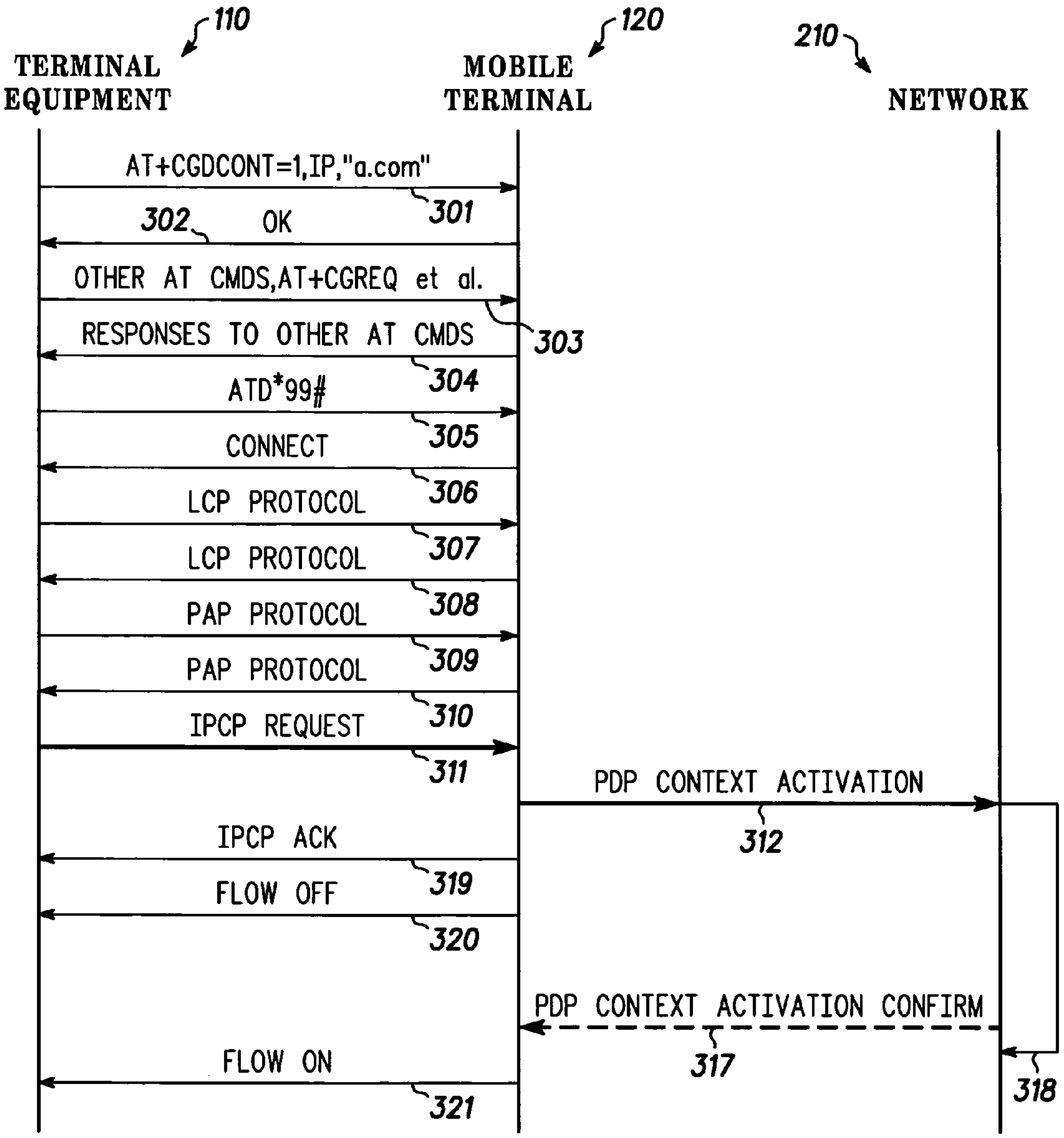
FIG. 4 is a connection diagram depicting connection negotiation associated with an exemplary session between a mobile terminal and a terminal equipment in accordance with one improved method.

As noted above, one solution may be implemented in MT 120 by attempting a Network Address Translation (NAT) as shown by the ladder diagram 400 of FIG. 4. Incoming IPCP message 311 requesting an IP address from MT 120 can be responded to by providing in IPCP Acknowledge 319, in the case of static addressing an arbitrary address, or assigning a fake IP address if the request is for a dynamic address. MT 120 may then initiate a "flow off" 320 to TE 110 through, for example, the assertion of flow control signals as are known in the art, to prevent subsequent data transfer from MT 120. By interrupting flow so that further data transfer and protocol progress is suspended, time is provided for PPP related PSP context activation to complete. MT 120 awaits completion of PDP context activation marked by the reception from network 210 of PDP context activation confirm message 317. If PDP context activation is successful, MT 120 preferably initiates a "flow on" 321 to turn data transfer in TE 110 back on again, by asserting flow control signals as are known in the art, and performs an IP address swap of the spoofed address for the valid address returned in the PDP context activation confirm message 317 for every packet that is transferred. If the context activation is unsuccessful, the link may be forcefully brought down as manifested by the completion of the dial-up session followed immediately by a link failure. It will be appreciated that the above described solution can in certain instances place additional requirements on an operator associated with a network 210 as a result of the actual IP address not being visible to a network application associated with TE 120. For example, since additional computational overhead may be necessary at the MT, such as re-computing checksums after the destination and source IP addresses have been swapped.

Figure 5:
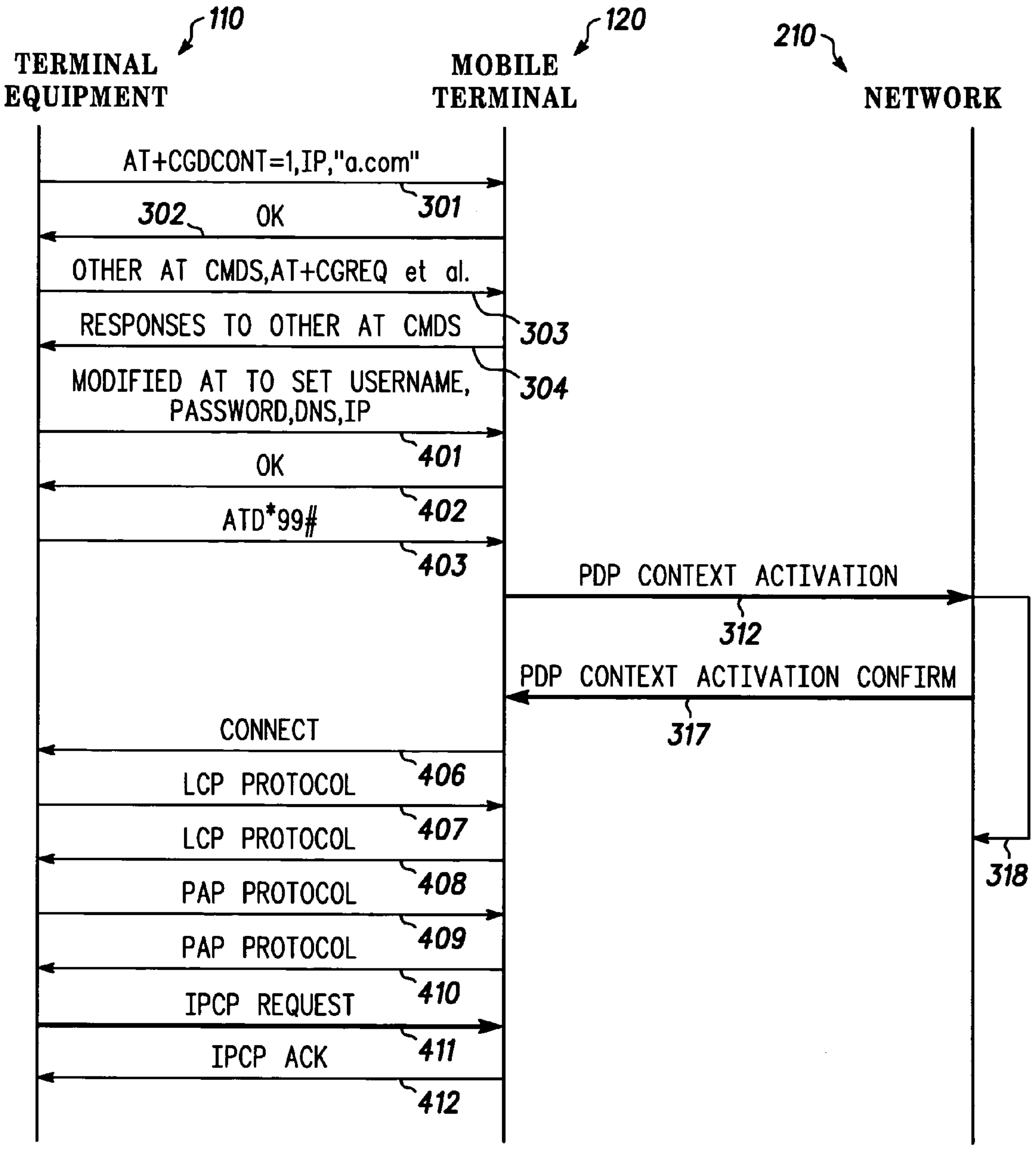
FIG. 5 is a connection diagram depicting connection negotiation associated with an exemplary session between a mobile terminal and a terminal equipment in accordance with various exemplary embodiments.

Another embodiment of a solution that attempts to minimize any additional requirements on an operator is illustrated, for example, by the ladder diagram 500 of FIG. 5. Generally this approach involves using a specific set of enhanced AT commands to enable actual network activation before PPP negotiation begins to minimize any changes relative to the operator. In accordance with various exemplary embodiments, exemplary enhanced AT commands may be transferred between TE 110 and MT 120 using, for example, a basic transfer protocol such as a clear text protocol. It will be appreciated by one of ordinary skill that a clear text protocol may be used to send unencrypted text directly over a TCP connection without using any additional protocols. It will further be appreciated that AT commands are well known in the art as being the accepted standard for communications with a modem and generally contain messages which are of a control type and which allow one device to connect to another using a modem. AT commands further allow for the resulting connection to be configured for a wide range of operating modes and parameters. In GPRS, AT commands are useful for module to module configuration within a GPRS mobile terminal or between a GPRS mobile terminal and external terminal equipment.

In accordance with GPRS standards, additional AT commands can be advantageously specified, where for example, there are presently no AT commands available to solve the above described problems or further problems such as authentication and the like. It will be appreciated that a clear text path, such as that established between TE 110 and MT 120 prior to the establishment of a PPP connection, may not be suitable or desirable for certain PPP options like the transfer of authentication information. In accordance with various exemplary embodiments, a set of AT commands can be provided, however, the transfer of certain PPP options such as username and password over the clear text path, may still remain undesirable.

Accordingly, in addition to the enhanced AT commands, an encoding and decoding algorithm can, for example, be made available at TE 110 and MT 120, for encoding and decoding a username and password prior to native transfer of such information. It will be appreciated that in accordance with, for example, 3G TS 29.061 V3.3.0 (2000-03) Technical Specification 3rd Generation Partnership Project; Technical Specification Group Core Network; Packet Domain; Interworking between the Public Land Mobile Network (PLMN) supporting Packet Based Services and Packet Data Networks (PDN) (Release 1999), MT 120 is preferably already configured to support a native mode transfer, e.g. binary data transfer in some embodiments, for SMS related AT commands. The 3GPP specification, for example, defines a PDU mode with which TE 110 and MS 120 can communicate binary data. A similar transfer mode is required to allow sending data while selectively preventing AT command parser from detecting an end of line character. Note that native transfer or native mode data transfer (hereafter binary data transfer) refers to an information transfer of raw unformatted data that is protocol independent and thus typically only appreciated by the intended recipient, with one example being a binary data transfer.

In accordance with various exemplary embodiments, IPCP options requiring negotiation include IP address, compression information, DNS address, username, and password. Thus additional or modified AT commands required to facilitate such negotiation would be required. A connection session involving such commands is illustrated in FIG. 5. TE 110, as previously described can begin a session by issuing command 301 including "AT+CGDCONT=1,IP,"a.com" to begin the context activation process. MT 120 issues response 302 including "OK" to acknowledge command 301. TE 110 may issue additional AT commands 303 and MT 120 issues responses 304. TE 110 now preferably issues modified commands 401 to set username, password, DNS, IP, and the like. An exemplary set of commands include: TE 110 sends AT+CGKEY=<number> to establish an encryption key; MT 120 responds with the encryption key if any, TE 110 encrypts username, password which has been obtained previously from, for example, a user or a register associated with a user or the like; TE 110 sends AT+CGMODE="bin" to establish a binary transfer mode; TE 110 sends AT+CGUSR="<name>" or the encrypted user name; TE 110 sends AT+CGPWD="password" or the encrypted password; MT 120 decrypts the received data and acknowledges username and password with response 402 including an "OK" message; TE 110 sends AT+CGDNS1=A.A.A.A or the DNS address; and TE 110 sends AT+CGDCONT=<context info>.

Finally, TE 110 initiates a dial-up request 403 including an "ATD*99#" message which initiates the transfer of PDP context activation message 312 from MT 120 to network 210. It will be appreciated that because of the transfer of information between TE 110 and MT 120 in accordance with the modified messages described above, PDP context activation may proceed with all necessary information. Thus PDP activation confirm message 317 can be quickly issued to MT 120 from network 210 well within timeout period 318 to complete the connection at which point MT 120 issues response message 406 including CONNECT to TE 110. LCP protocol exchange may now occur between TE 110 and MT 120 with message 407, and response 408, followed by PAP protocol exchange with message 409 and response 410. Finally, TE 110 issues IPCP request 411 which is promptly acknowledged by MT 120 with IPCP acknowledge 412.

To better understand a session negotiation scenario 600 in accordance with various exemplary embodiments, a flow chart is illustrated in FIG. 6, outlining various procedures capable of being implemented, for example, on a processor or the like with accompanying software as would be appreciated by one of ordinary skill in the art. At start 501, which may occur, for example, upon the occurrence of a user request for a dial-up session, conventional steps may occur as previously described for PDP context activation, up to, for example, MT 120 responding to AT commands through response 304, described above in connection with FIG. 3–FIG. 5. It will be appreciated that in many instances, a user may not even realize that a dial-up session is underway, but merely performs a simple act such as starting an application in TE 110 requiring access to network 210 through, for example, MT 120. At 502, modified AT commands as described above, may be issued, for example, from TE 110 to MT 120 to set parameters such as username, password, DNS address, IP address, and the like where these modified commands are further acknowledges by MT 120. At 503, an exemplary dial-up session may be initiated by TE 110 through the issuance of an ATD*99# command which begins PDP context activation at 504. It will be appreciated that MT 120, through the exchange of modified AT commands at 502, now has all the information required for prompt PDP context activation, thus a PDP context activation confirmation occurs promptly at 505 by way of a confirmation received at MT 120 from, for example, network 210 as previously described. At 506, the connection is established and a PDP IP session may begin including the negotiation of PPP protocol parameters through the exchange of messages and responses 406–412 as described above between TE 110 and MT 120 at which point the pertinent portion of the exemplary procedure ends at 507, until such a time as the present session ends and a new dial-up session is desired.

This disclosure is intended to explain how to fashion and use various embodiments in accordance with the invention rather than to limit the true, intended, and fair scope thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method for establishing a dial-up connection comprising:

establishing a control path prior to an activation of a context associated with the dial-up connection; and exchanging a command over the control path to set information related to the activation of the context, the information transferred over the control path in a native transfer mode prior to an issuance of a dial-up request associated with the dial-up connection.

2. A method according to claim 1, further comprising encoding the information related to the activation of the context prior to transfer over the control path in the native transfer mode.

3. A method according to claim 1, further comprising decoding the information related to the activation of the context received over the control path in the native transfer mode.

4. A method according to claim 1, wherein the command includes a sequence of commands including one or more of: AT+CGKEY, AT+CGMODE, AT+CGUSER, AT+CGPWD, AT+CGDNS1, and AT+CGCONT.

5. A method according to claim 1, wherein the dial-up connection is established with a Mobile Terminal (MT) and wherein the exchanging further includes receiving the command at the MT.

6. A method according to claim 1, wherein the dial-up connection is established with a Terminal Equipment (TE) and wherein the exchanging further includes issuing the command from the TE.

7. A method according to claim 1, wherein the dial-up connection is established between a Mobile Terminal (MT) and a Terminal Equipment (TE) and wherein the TE issues the command to the MT.

8. A method according to claim 1, wherein the control path includes a Clear Text path.

9. A method according to claim 1, wherein the command includes a modified AT command and the information includes one or more of: a username, a password, a DNS address, and an IP address.

10. A method according to claim 1, wherein the context includes a PDP context.

11. A method according to claim 7, wherein the TE and the MT are included within a single device.

12. A method according to claim 1, wherein the native transfer mode is a binary transfer mode.

13. An apparatus in a TE for establishing a connection with an MT, the apparatus comprising:

an interface capable of being coupled to a connection medium;

a memory; and a processor coupled to the memory and the interface, the memory storing instructions for causing the processor to:

establish a control path with the MT over the interface prior to a context activation associated with a dial-up request; and issue a command to the MT over the control path to set information related to the context activation, the information transferred to the MT over the control path in a native transfer mode prior to an issuance of the dial up request.

14. An apparatus according to claim 13, wherein the control path includes a Clear Text path.

15. An apparatus according to claim 13, wherein the instructions further cause the processor to encode the information related to the activation of the context prior to transfer over the control path in the native transfer mode.

16. An apparatus according to claim 13, wherein the command includes a sequence of commands including one or more of: AT+CGKEY, AT+CGMODE, AT+CGUSER, AT+CGPWD, AT+CGDNS1, and AT+CGCONT.

17. An apparatus according to claim 13, wherein the command includes a modified AT command and the information includes one or more of: a username, a password, a DNS address, and IP address.

18. An apparatus according to claim 13, wherein the context includes a PDP context.

19. An apparatus according to claim 13, wherein the TE and the MT are included within a single device.

20. An apparatus according to claim 13, wherein the connection medium includes one of: a wired connection medium, and a wireless connection medium.

21. An apparatus in an MT for establishing a connection with a TE, the apparatus comprising:

an interface capable of being coupled to a connection medium;

a memory; and a processor coupled to the memory and the interface, the memory storing instructions for causing the processor to:

establish a control path with the TE over the interface prior to a context activation associated with a dial-up request; and receive a command from the TE over the control path to set information related to the context activation, the information received from the TE over the control path in a native transfer mode prior to an issuance of the dial up request.

22. An apparatus according to claim 21, wherein the control path includes a Clear Text path.

23. An apparatus according to claim 21, wherein the information related to the activation of the context is encoded prior to transfer over the control path in the native transfer mode.

24. An apparatus according to claim 23, wherein the instructions further cause the processor to decode the information related to the activation of the context received over the control path in the native transfer mode.

25. An apparatus according to claim 21, wherein the command includes a sequence of commands including one or more of: AT+CGKEY, AT+CGMODE, AT+CGUSER, AT+CGPWD, AT+CGDNS1, and AT+CGCONT.

26. An apparatus according to claim 21, wherein the command includes a modified AT command and the information includes one or more of: a username, a password, a DNS address, and IP address.

27. An apparatus according to claim 21, wherein the context includes a PDP context.

28. An apparatus according to claim 21, wherein the TE and the MT are included within a single device.

29. An apparatus according to claim 21, wherein the connection medium includes one of: a wired connection medium, and a wireless connection medium.

* * * * *